No. 742,254.  
Patented October 27, 1903.

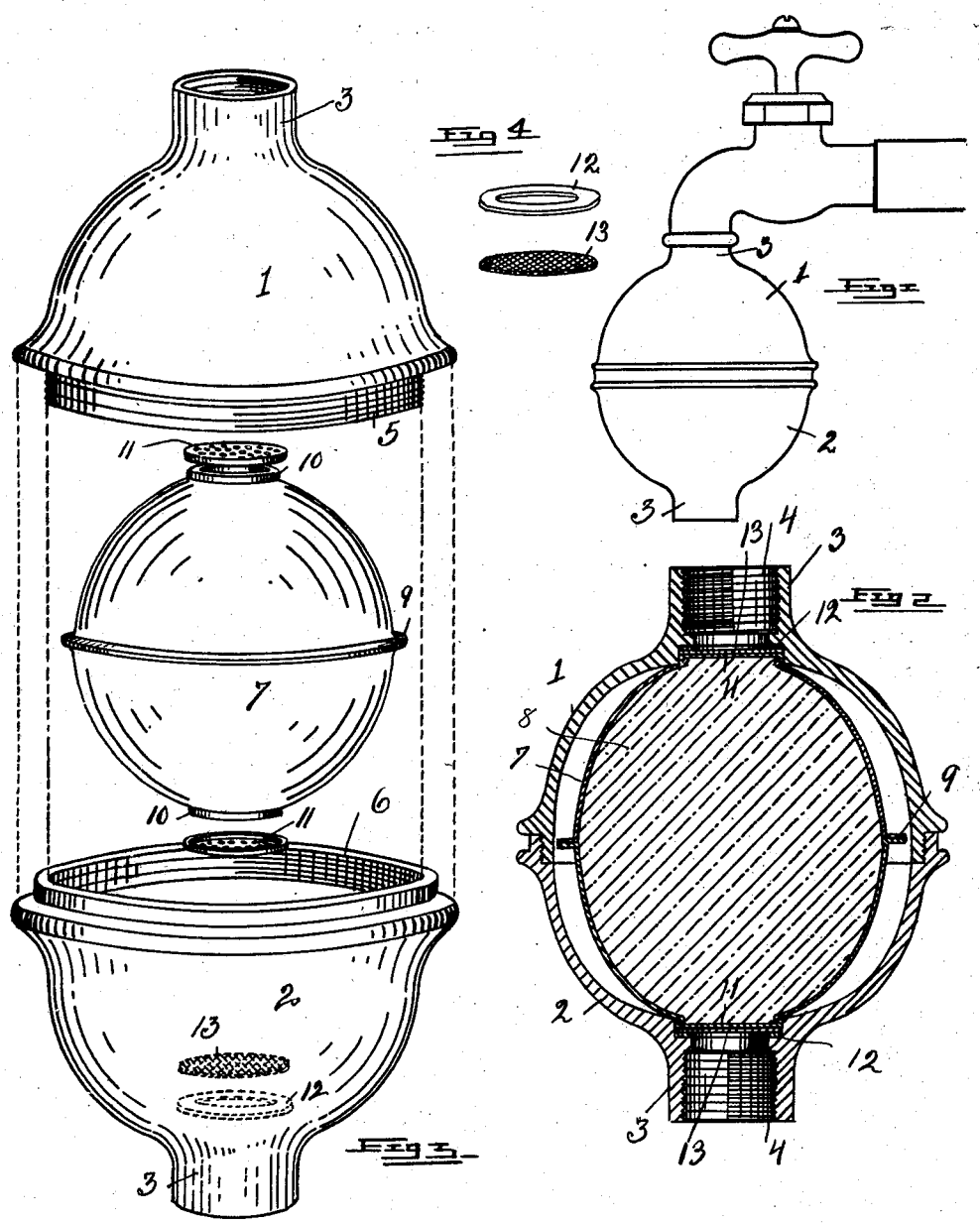

UNITED STATES PATENT OFFICE.

ALEXANDER F. STERN, OF MARINE CITY, MICHIGAN.

WATER-FILTER.

SPECIFICATION forming part of Letters Patent No. 742,254, dated October 27, 1903.

Application filed January 19, 1903. Serial No. 139,502. (No model.)

*To all whom it may concern:*

Be it known that I, ALEXANDER F. STERN, a citizen of the United States, residing at Marine City, in the county of St. Clair, State of Michigan, have invented certain new and useful Improvements in Water-Filters; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a water-filter adapted for attachment to a water-cock; and it consists in the construction and arrangement of parts hereinafter fully set forth, and pointed out particularly in the claims.

The object of the invention is to provide simple and efficient means for rapidly and efficiently filtering the water as it passes from the pen-stock, so as to remove all foreign matter therefrom.

The above object is attained by the structure illustrated in the accompanying drawings, in which—

Figure 1 is a general view showing my improved filter attached to a water-cock. Fig. 2 is an enlarged longitudinal section through the device. Fig. 3 is an enlarged perspective view of the several parts of the filter separated. Fig. 4 is a perspective view of one of the washers and sieves or screens located in the ends of the shells forming the outer casing.

Referring to the characters of reference, 1 and 2 designate the shells, respectively, which united form the outer casing of the filter. These shells, as will be seen, are hemispherical in shape, and each is provided with a projecting neck 3 having a central opening therethrough internally threaded, as at 4, for attachment to a pen-stock or water-cock. The shell 1 of the case is provided with a depending flange 5, which is externally threaded to screw into the correspondingly-tapped opening 6 of the shell 2, whereby said shells are united to form a globular casing. Within the globular case is a spherical retainer 7, adapted to receive and confine the filtering material 8 and is formed of light sheet metal stamped in halves, which are united at the medial line 9. In the opposite walls of the receptacle 7 are apertures surrounded by a raised ledge 10. Adapted to fit over said ledge, so as to cover said openings, are the flanged perforated caps 11. The inner receptacle 7, containing the filtering substance, with the perforated caps closing the openings therethrough, is placed within the outer casing, so that said caps will lie within annular recesses in the necks of the shells forming said case. Said recesses are of sufficient depth to receive the compressible washers 12, which are first placed therein, and the wire or screen disks 13, which lie against said washers and against which the perforated caps 11 bear when the parts are forced into place by screwing the shells of the case together, as shown in Fig. 2. By this arrangement the pressure exerted as the shells of the case are screwed together forces the washers 12 upon their seats and prevents the passage of water into the space between the inner receptacle and the outer case and compels all of the water which flows from the water-cock to pass through the filtering substance in the inner case after first passing through the screen 13 and the perforated cap 11.

It will be noted that the screen-disk 13 lies upon the cap 11, which serves as a support for said disk to prevent it from being bent by the pressure of the water which enters the filter. This filter is reversible, and after being used for a time in one position it may be reversed, so as to wash away what foreign substance may have been carried upon the screen 13 at the ingress end of the case.

When it is desired to clean the filter or change the filtering substance, the shells of the case are unscrewed, allowing the inner receptacle to be taken out and the contents removed therefrom by taking off the perforated caps 11. After being thoroughly cleansed the receptacle 7 may be refilled with filtering substance and the caps 11 restored; when it is again placed within the outer case and secured in position by screwing the shells of the case together.

Having thus fully set forth my invention, what I claim as new, and desire to secure by Letters Patent, is—

1. In a filter, the combination of the outer case comprising hemispherical shells adapted to be screwed together and having ingress and egress openings, said shells also having annular recesses in their inner walls around said openings, an inner globular receptacle spaced from the side walls of the case adapted to contain the filtering substance having opposed apertures through its walls, of less diameter than the body of the receptacle and having cylindrical ledges surrounding said apertures which stand above the plane of the wall of the receptacle adapted to enter the recesses in the walls of the shells and maintain the inner receptacle in position, perforated caps fitted upon said ledges over said apertures adapted to be confined in said recesses when the shells are screwed together to retain said parts in position and center the inner receptacle within the outer case.

2. In a filter, the combination of the hemispherical shells adapted to be screwed together having ingress and egress openings, there being in the wall of each of the shells, an annular recess around said openings, an inner globular receptacle adapted to contain the filtering substance having opposed openings in the walls thereof, of less diameter than the body of the receptacle, a cylindrical ledge therearound standing above the plane of the wall of the receptacle adapted to enter the recesses around the shell-openings, perforated caps over said openings, compressible washers lying in said recesses, screens bearing upon said washers, and the perforated caps of the inner receptacle bearing forcibly against said screens when the shells of the case are united.

In testimony whereof I sign this specification in the presence of two witnesses.

ALEXANDER F. STERN.

Witnesses:
W. E. FOLSOM,
NETTIE KIRCHNER.